3,385,783
AROMATIC HYDROCARBON SOLVENT
REGENERATED BY FILTRATION
Toshio Okuma, Des Plaines, Ill., assignor to Universal Oil Products Company, Des Plaines, Ill., a corporation of Delaware
Filed Oct. 10, 1966, Ser. No. 585,485
10 Claims. (Cl. 208—321)

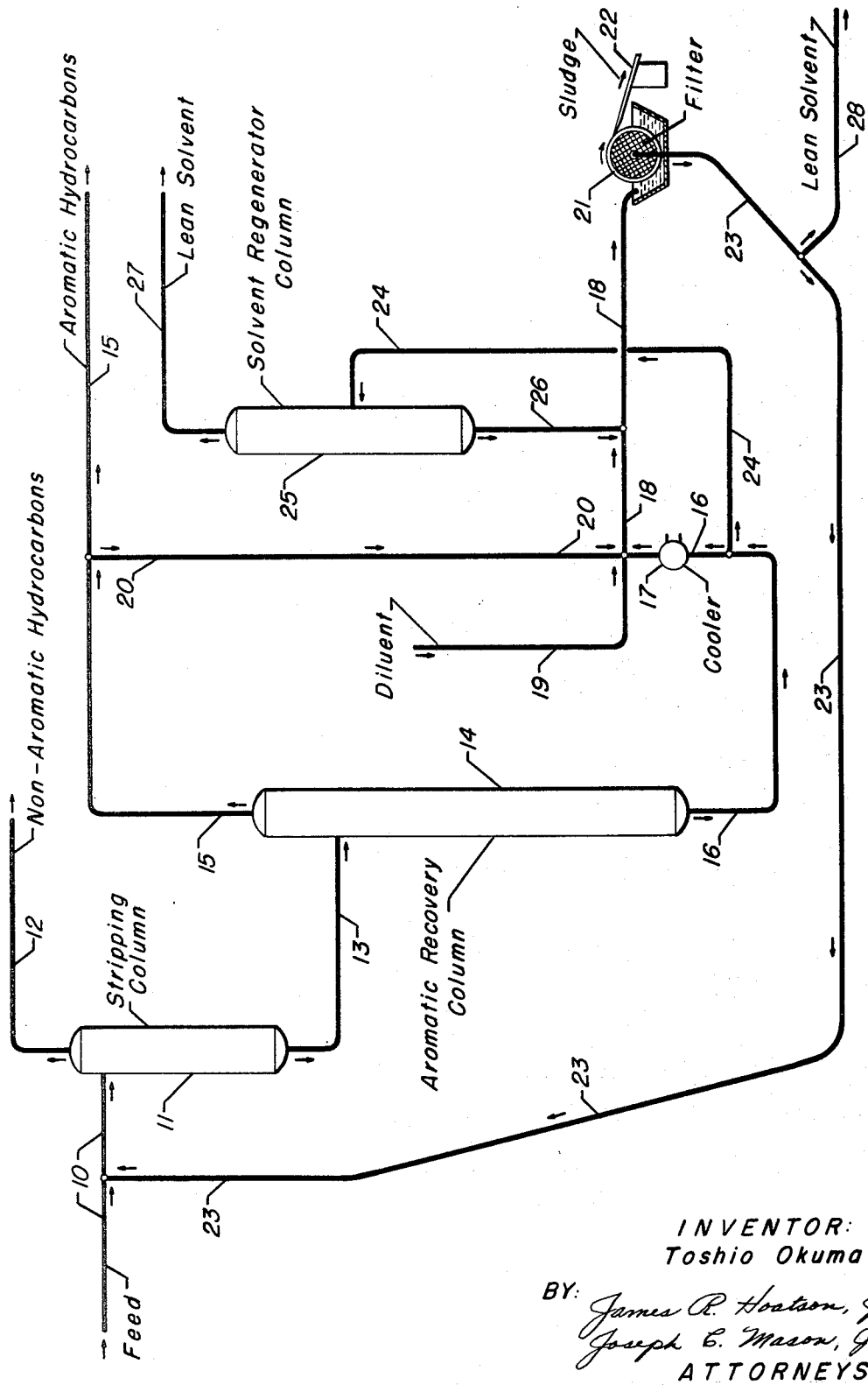

ABSTRACT OF THE DISCLOSURE

Method for solvent extracting a suitable feed stream to produce an aromatic extract and a non-aromatic raffinate. The aromatic extract is subsequently distilled to produce an aromatic hydrocarbon-solvent stream and a solvent stream which has become contaminated with impurities. At least a portion of the contaminated solvent is passed into filtering means under conditions sufficient to produce a regenerated solvent substantially free from the contaminants.

---

The present invention relates to a process for recovering aromatic hydrocarbons from a feed stream containing aromatic and non-aromatic hydrocarbons. It specifically relates to a process for the recovery of the aromatic hydrocarbons with solvent regeneration techniques. It particularly relates to an integrated process for recovering aromatic hydrocarbons and regenerating solvent suitable for reuse in the aromatic extraction process.

The technique of aromatic separation by solvent extraction is well known in the prior art. It is further known that the solvents employed in commercial aromatics extraction plants tend to undergo gradual chemical deterioration with continued use and that a means of solvent regeneration must be employed in order to recover clean solvent from the product of deterioration.

A preferred solvent which may be utilized in an aromatics extraction process is a solvent of the sulfolane type. This solvent possesses a five-membered ring containing one atom of sulfur and four atoms of carbon with two oxygen atoms bonded to the sulfur atom of the ring. Those skilled in the aromatics extraction art are well versed in the characteristics of this type of solvent.

Other solvents which may be included and may be satisfactorily used in the practice of the present invention are the sulfolenes, such as 2-sulfolene or 3-sulfolene. Still other typical solvents which have a high selectivity for separating aromatic hydrocarbons from non-aromatic hydrocarbons, and which may be processed within the scope of the present invention, are 2-methylsulfolane, 2,4-dimethylsulfolane, methyl-2-sulfonylether, n-aryl-3-sulfonylamine, 2-sulfonylacetate, diethyleneglycol, various polyethyleneglycols, dipropyleneglycol, various polypropyleneglycols, dimethylsulfoxide, n-methylpyyrrolidone, and the like. The specifically preferred solvent for use in the practice of the present invention is sulfolane.

In the commercial aromatics extraction plants the rich solvent composition which leaves the extraction zone is sent to a solvent separation zone wherein the aromatic hydrocarbon is separated from the solvent. The solvent separation zone normally comprises one or more distillation columns wherein a non-aromatic hydrocarbon fraction is withdrawn for recycle to the extraction zone and the high purity aromatic extract fraction is withdrawn and sent to a subsequent separation zone for recovery of aromatic hydrocarbons in high concentration. Typically, the water content of the rich solvent composition provides a relatively volatile material which is distilled in part from the rich solvent within the solvent separation zone and provides an effective means of vaporizing virtually all of the hydrocarbons from the solvent by steam stripping. The resulting lean solvent composition is then generally recycled to the aromatic extraction zone.

The solvents which are applicable to the practice of the present invention and to the aromatics extraction process generally, are known to be thermally unstable. The instability is not pronounced, however, and only becomes evident upon prolonged recycling of the solvent whereupon the accumulation of the decomposition products becomes evident. Generally, the rate of decomposition increases with increasing temperature. Thus, it has been found that the rate of decomposition of sulfolane in an inert atmosphere is 0.002% per hour at 200° C., 0.010% per hour at 220° C., and 0.020% per hour at 230° C. Similar thermal effects are observed with other solvents and it is therefore desirable to keep temperature levels as low as possible. Accordingly, it is the practice, for example, when using the sulfolane solvent system to set a maximum processing temperature of about 350° F., while in the diethyleneglycol solvent system it is the practice to set a maximum processing temperature of about 380° F. Consequently, the prior art defines such processing temperatures as being the point of thermal instability, although it is known there is some decomposition occurring below such temperature levels. Similar points of thermal instability may be readily ascertained for other solvent systems.

It is known that the solvent decomposition results in the production of acidic organic deterioration products as well as polymerization products of a resinous character. It is further known that the decomposition is accelerated by traces of air. The exact nature of the final decomposition products is not fully known, but where sulfolane is the solvent the decomposition initially produces sulfur dioxide, sulfur trioxide and olefins.

The presence of organic acids within the aqueous solvent and of sulfurous gases within an equeous sulfolane solvent is known to cause corrosion of the steel equipment utilized, and it is therefore usual practice to add organic amine compounds to the solvent composition as corrosion inhibitors. Suitable organic amines for use in the solvent composition may be selected from the aliphatic, aromatic, naphthenic, and heterocyclic amines generally, as well as the alkanolamines containing one or more amine groups and/or hydroxy groups per molecule. The amine may also be a primary, secondary or tertiary amine, but the preferred amine utilized as a corrosion inhibitor is an alkanolamine, and, more particularly, monoethanolamine. Because of the basic characteristics of the amine inhibitors, these materials react with the acidic solvent decomposition products to form amine salts and amides at the temperature conditions utilized in the aromatics extraction process.

With continued circulation of the solvent composition within the aromatic extraction process, the solvent tends to accumulate resinous, polymeric solvent decomposition products, amine salts of the acidic solvent decomposition products, amides of the acidic solvent decomposition products, and other relatively non-volatile consituents from other sources. All of these are characterized as being relatively non-volatile contaminants, and the accumulation results in the eventual precipitation of tarry, insoluble deposits on the interior surfaces of the processing equipment resulting in reduced heat transfer efficiency due to fouling of heat exchangers and resulting in reduced separation efficiencies due to fouling of extractor decks and fractionating column trays.

In an effort to overcome the problems associated with solvent deterioration, the prior art practice has been to withdraw from the lean solvent recycle stream a slip stream of lean solvent for solvent regeneration and recovery of clean, lean solvent composition. The withdrawal rate is normally sufficient to provide that the entire solvent inventory of the aromatics extraction process is passed through the solvent regeneration system once every five to ten days. In this manner, the relatively non-volatile contaminants never accumulate to a sufficiently high concentration to cause deposition of tarry, insoluble sludge which is otherwise encountered in the solvent circulating system.

The solvent regenerating system normally comprises a distillation column which is operated under vacuum in order to minimize the vaporization temperature of the thermally unstable solvent. Vaporization normally is accomplished by provision of a reboiler heat exchanger and the solvent vapor containing the inhibitor and water is removed overhead, condensed, and returned to the aromatics extraction process as a clean, lean solvent liquid. Since the solvent is an expensive material, the practice is not to continuously remove a liquid stream from the bottom of the solvent regenerator, for to do so would not only result in the removal of relatively non-volatile contaminants, but it would also result in the loss of valuable solvent. It is therefore the practice to allow the liquid inventory in the bottom of the solvent regenerator column to remain within the system, and in effect this provides a reservoir wherein non-volatile solvent contaminants are accumulated and concentrated.

The accumulation of the solvent contaminants in the bottom of the solvent regenerator results in the rapid fouling of the reboiler heat exchanger means necessitating a reduction in the charge rate of lean solvent to the regenerating unit. Upon the fouling of the reboiler heat exchanger means it becomes necessary to shut down the solvent regenerator and discard the liquid inventory of the reboiler. Laboratory analysis of the discarded liquid inventory has disclosed that this liquid is consistently in the neighborhood of 90% pure solvent. Since the solvent chemical is expensive, and since solvent regenerator shutdown and cleanout appears to occur every few weeks, it is desirable that the entire operation be made more efficient and be made a continuous operation.

Therefore, it is an object of this invention to provide a process for separating aromatic hydrocarbons from a feed stream containing aromatic and non-aromatic hydrocarbons by a process which minimizes solvent deterioration and maximizes solvent recovery.

It is another object of this invention to provide a method for regenerating solvent in a more facile and economical manner than has heretofore been possible.

A still further object of this invention is to provide a method for separating aromatic hydrocarbons from an aromatic concentrate feed stream in a process which utilizes sulfolane as the solvent for extracting aromatic hydrocarbons from a petroleum feed stock.

These and other objects of the invention will be apparent from the description presented hereinbelow with reference to the appended drawing which is a diagrammatic representation of apparatus useful in the practice of the present invention.

In accordance with the present invention, a method for separating aromatic hydrocarbons from a solvent extract feed stream containing aromatic and non-aromatic hydrocarbons comprises the steps of (a) introducing said feed stream into a first separation zone under conditions sufficient to produce a non-aromatic hydrocarbon fraction and a solvent fraction containing aromatic hydrocarbons; (b) passing said solvent fraction into a second separation zone under conditions sufficient to produce a distillate fraction comprising aromatic hydrocarbons and a bottoms fraction comprising solvent having contaminants therein; (c) passing at least a portion of said bottoms fraction into filtering means under conditions sufficient to produce a regenerated solvent stream substantially free from said contaminants; and, (d) recovering aromatic hydrocarbons in high concentration.

Another embodiment of this invention comprises passing a portion of the bottoms fraction into said filtering means in admixture with a diluent stream.

Still another embodiment of this invention comprises a diluent which is a portion of said distillate fraction.

A particular embodiment of the present invention is a method for separating aromatic hydrocarbons from a solvent extract feed stream containing aromatic and non-aromatic hydrocarbons which comprises the steps of (a) introducing said feed stream into a first separation zone and withdrawing therefrom a non-aromatic hydrocarbon fraction and a solvent fraction containing aromatic hydrocarbons; (b) passing the solvent fraction into a second separation zone under conditions sufficient to produce a distillate fraction comprising aromatic hydrocarbons and a bottoms fraction comprising solvent having relatively non-volatile contaminants therein; (c) introducing at least a portion of said bottoms fraction into third separation means under conditions sufficient to produce a distillate stream comprising regenerated solvent and a residual fraction comprising solvent and contaminants; (d) passing the residual fraction into filtering means; (e) withdrawing from the filtering means a solvent stream substantially free from contaminants and a reject stream comprising said contaminants; and, (f) recovering aromatic hydrocarbons in high concentration.

In the practice of this invention it is preferred to use a diluent stream in admixture with the contaminated solvent stream as feed to the filtering means. The preferred diluent is an aromatic hydrocarbon, e.g., toluene, since the filtering operation is performed more efficiently if the feed stream is a single phase system containing the contaminants. It is within the contemplation of the present invention, however, to use as a diluent stream materials which are at least partially miscible with the solvent, such as the non-aromatic fraction separated during the solvent extraction process. For economy of operation, the recovered filtrate, or regenerated solvent containing the diluent, is recycled within the process scheme. For example, if the diluent is an aromatic hydrocarbon it is preferred to recycle the filtrate to the stripping column more fully discussed hereinbelow, and for the situation wherein a non-aromatic hydrocarbon is used as the diluent the filtrate, or regenerated solvent stream, may be recycled to the extraction zone. It is distinctly preferred in the practice of this invention to use as the diluent at least a portion of the aromatic-containing overhead stream from the solvent recovery column more fully discussed hereinbelow, and to recycle the filtrate, or regenerated solvent, to the stripping column.

From the embodiments presented herein, it is to be noted that the present invention encompasses the use of a filtering means alone to regenerate the solvent; to use a combination of a prior art regeneration scheme plus a filtering means; and the prior art regeneration zone plus a filtering means on the contaminated lean solvent stream plus filtering means on the regenerator bottoms product. Additionally, the present invention encompasses recycling the ultimately recovered regenerated solvent, either together or separately, or in using the regenerated solvent in any other manner contemplated by those skilled in the art.

As used herein the term "filtering means" is intended to cover thickeners, clarifiers and filters, including centrifuges, both with and without filters, each operating under either pressure or vacuum and each operating either batch or continuous. Additionally, the term includes the use of filter aids although it is not a requirement of the present invention to use such aid. If one is desirable, it is preferable to use conventional filter aids, such as kieselguhr or diatomaceous earth. The exact type of filtering means utilized in the practice of this invention is not, per se, the point of novelty of this invention. Any filtering means known to those skilled in the art for handling materials described herein may be used satisfactorily in the practice of this invention. Also, as used herein, the term "solvent extract feed stream" is intended to embody any aromatic concentrate feed stream containing aromatic and non-aromatic hydrocarbons. Preferably, the term covers the extract stream from a conventional aromatic solvent extraction process step.

Referring now to the drawing, a contaminated, lean solvent stream enters the process by means of line 10 and is admixed with hereinafter specified regenerated solvent from line 23. The combined admixture is passed into stripping column 11 wherein non-aromatic hydrocarbons are withdrawn from the process via line 12. Preferably, these non-aromatic hydrocarbons are recycled to the extraction zone which produced the solvent extract feed stream of the present invention.

Referring again to the drawing, a bottoms fraction comprising solvent having dissolved therein aromatic hydrocarbons, is removed from stripping column 11 via line 13 and passed into aromatics recovery column 14. Suitable distillation conditions are maintained in column 14 in order to produce a distillate fraction comprising aromatic hydrocarbons which are withdrawn from the process via line 15. The bottoms of column 14 comprise contaminated solvent. Typically, the contaminated solvent stream comprises sulfolane and contains from about 0.5 to about 1.0 wt. percent water, traces of amine corrosion inhibitor, traces of amine salts of acidic sulfolane decomposition products, traces of amides of acidic sulfolane decomposition products, traces of resinous polymeric sulfolane decomposition products, and traces of other relatively non-volatile contaminants. This solvent stream is removed from column 14 via line 16 and, in one embodiment of this invention, is passed through cooler 17 in order to reduce its temperature to, say, 90° F. to 120° F., e.g. 100° F. Suitable diluent, say, from 50% to 500% by volume, preferably about 100%, is added to the cooled contaminated solvent via line 19 wherein the combined diluted stream is passed into filtering means 21. Sufficient filtering conditions are maintained on filter 21 so that sludge comprising relatively non-volatile contaminants is removed from the process via line 22. The filtrate, or regenerated solvent substantially free from contaminants, is removed from filter 21 via line 23 and recycled to the stripping column 11 as the specified regenerated solvent stream. If desired, a drag stream of regenerated solvent may be withdrawn from the process via line 28 for other uses.

In a particular embodiment of this invention no outside diluent is added via line 19, rather a portion of the aromatic hydrocarbons in line 15 is withdrawn via line 20 and admixed with the cooled contaminated solvent in line 16 to produce a diluted contaminated solvent stream in line 18 which is processed as hereinabove described.

In still another embodiment of this invention, the entire contaminated solvent stream is passed from line 16 through line 24 into solvent regenerator column 25.

The material in line 24 is preferably passed into solvent regenerator column 25 at a point in the upper section of the column. The material has also been heated (means not shown) to a suitable temperature for vaporization. The unvaporized solvent composition comprising sulfolane and substantially all of the relatively non-volatile contaminants, drains into the bottom of column 25. The preferred conditions maintained within regenerator column 25 include a temperature of about 330° F. and a pressure of about 20 mm. Hg absolute. The vaporized solvent comprising sulfolane, water and amine inhibitor is withdrawn from regenerator column 25 via line 27 and is preferably recycled to the solvent extraction step which produced the solvent extract feed in line 10.

The bottom of regenerator column 25 comprises a liquid reservoir preferably containing heat exchanger means whereby the non-volatile contaminants of the solvent may be accumulated. However, in the practice of this invention, it is distinctly preferred that the bottoms material after a suitable level has been established in column 25, be continually withdrawn via line 26 and passed into filter means 21 for processing as hereinabove described.

In each of the embodiments discussed herein, aromatic hydrocarbons in high concentration are recovered from the process.

The following example will illustrate the practice of the present invention.

EXAMPLE

With reference to the appended drawing, a material from line 16 is passed at the rate of 500 barrels per day and a temperature of about 350° F., into cooler 17 wherein the stream is cooled to a temperature of about 100° F. Approximately 500 barrels per day of diluent is added via line 20 to produce a diluted contaminated solvent stream in line 18 at a temperature of about 100° F. This diluted stream is passed into a rotating drum vacuum filter wherein sludge at the rate of 5 to 100 pounds per day, typically about 10 pounds per day, is removed. The filtrate from the filter corresponding to that in line 23 is withdrawn and recycled to stripper column 11 in admixture with the feed coming into the process via line 10. For purposes of this example, it is preferred to precoat the filter using a diatomaceous earth.

The invention claimed is:
1. Method for separating aromatic hydrocarbons from a solvent extract feed stream containing aromatic and non-aromatic hydrocarbons which comprises the steps of:
(a) introducing said feed stream into a first separation zone under conditions sufficient to produce a non-aromatic hydrocarbon fraction and a solvent fraction containing aromatic hydrocarbons;
(b) passing said solvent fraction into a second separation zone under conditions sufficient to produce a distillate fraction comprising aromatic hydrocarbons and a bottoms fraction comprising solvent having contaminants therein;
(c) passing at least a portion of said bottoms fraction into filtering means under conditions sufficient to produce a regenerated solvent stream substantially free from said contaminants; and,
(d) recovering aromatic hydrocarbons in high concentration.

2. Method according to claim 1 wherein said portion of bottoms fraction is passed into said filtering means in admixture with a diluent stream.

3. Method according to claim 2 wherein said diluent is a portion of said distillate fraction.

4. Method according to claim 2 wherein said diluent comprises toluene, is admixed in an amount from 30% to 300% by volume, and said regenerated solvent stream is recycled to the separation zone of step (a).

5. Method according to claim 4 wherein said solvent comprises sulfolane.

6. Method for separating aromatic hydrocarbons from a solvent extract feed stream containing aromatic and non-aromatic hydrocarbons which comprises the steps of:
(a) introducing said feed stream into a first separation zone and withdrawing therefrom a non-aromatic hydrocarbon fraction and a solvent fraction containing aromatic hydrocarbons;
(b) passing the solvent fraction into a second separation zone under conditions sufficient to produce a distillate fraction comprising aromatic hydrocarbons and a bottoms fraction comprising solvent having relatively non-volatile contaminants therein;
(c) introducing at least a portion of said bottoms fraction into third separation means under conditions sufficient to produce a distillate stream comprising regenerated solvent and a residual fraction comprising solvent and contaminants;
(d) passing the residual fraction into filtering means;
(e) withdrawing from the filtering means a solvent stream substantially free from contaminants and a reject stream comprising said contaminants; and, (f) recovering aromatic hydrocarbons in high concentration.

7. Method according to claim 6 wherein said residual fraction is admixed with a diluent stream prior to passing to the filtering means.

8. Method according to claim 7 wherein said diluent is an aromatic hydrocarbon stream, said regenerated solvent stream is recycled to the solvent extraction step which produced said feed stream, and said withdrawn solvent stream is recycled to the separation zone of step (a).

9. Method according to claim 8 wherein said diluent stream comprises a portion of said distillate fraction from step (b).

10. Method according to claim 6 wherein said solvent comprises sulfolane.

References Cited
UNITED STATES PATENTS

| | | | |
|---|---|---|---|
| 2,612,465 | 9/1952 | Kiersted et al. | 208—38 |
| 2,734,849 | 2/1956 | Gross et al. | 208—33 |
| 2,914,584 | 11/1959 | McCaulay et al. | 260—674 |
| 3,245,902 | 4/1966 | Adams et al. | 260—674 |

HERBERT LEVINE, *Primary Examiner.*